2,945,067
Patented July 12, 1960

2,945,067

CONVERSION OF VERBANONE

Eugene A. Klein, West Los Angeles, Calif., assignor to The Glidden Company, Cleveland, Ohio, a corporation of Ohio No Drawing. Filed Apr. 26, 1957, Ser. No. 655,183

6 Claims. (Cl. 260—587)

This invention relates to the conversion of a pinane ketone to valuable odor and flavor derivatives thereof. The invention is more particularly concerned with the conversion of verbanone to oxygenated derivatives which are useful in the flavor, perfume and pharmaceutical industries.

Heretofore, the preparation of valuable odor and flavor chemicals has been largely from essential oils which are derived from a large number of plants found in nature. The essential oils, as is known, are widely employed for imparting odor and flavor characteristics to a variety of classes of materials, e.g., food products, beverages, perfumes, pharmaceuticals, soaps and the like. The preparation of these essential oils, i.e., their extraction or isolation, as well as flavor and odor compounds derived therefrom, has involved considerable expense, and it can therefore be appreciated that new methods of preparing such materials from inexpensive and available sources would indeed be highly desirable.

It is a general object of this invention to prepare valuable odor and flavor chemicals from an inexpensive source.

Another object of this invention is the preparation of odor and flavor chemicals from readily available terpene chemicals.

A further object of this invention is the preparation of odor and flavor chemicals and/or substances enriched with said chemicals by conversion of a pinane ketone.

A more specific object of this invention is the conversion of verbanone to valuable odor and flavor chemicals and/or fractions enriched with them.

In accomplishment of the foregoing objects, I have found that I can prepare odor and flavor imparting chemicals by a process which comprises converting verbanone to a mixture comprising isomers thereof by thermally pyrolyzing said verbanone. I have found that when verbanone is pyrolyzed under certain preferred conditions, there is produced a series of chemicals and/or fractions containing valuable odor and flavor properties which are useful in the flavor, perfume and the like industries.

As a basic raw material for the obtainment of verbanone I can employ turpentine, which, as is well known, is a mixture of α- and β-pinene. α-Pinene can be readily oxidized, for example, by air, alone or in the presence of catalysts, to yield verbenone. The latter compound, or mixtures containing it, is thereafter easily converted to verbanone by catalytic hydrogenation. Moreover, verbanol, which can also be prepared from α-pinene, can be oxidized to verbanone. Accordingly, methods for preparing verbanone, which do not form a part of this invention, are well known and resort may be had to the literature for further elucidation. My invention is concerned with the conversion of verbanone, as will be understood from the description given below.

Verbanone is a ketone belonging to the pinane family of terpene chemicals and exists in optically active as well as racemic form. For the d-form, Simonsen, in "The Terpenes," vol. II, p. 235, second ed., shows the following characteristics: B.P. 222° C./760 mm., $d^{20°}$ 0.961, $n_D^{20°}$ 1.4751, $[\alpha]_D$ +52.55, M.P. of the semicarbazone 230° C. Hereinafter, the term verbanone is intended to include the optical as well as racemic or mixtures of these compounds.

In a broad aspect of my invention I have found that I can pyrolyze verbanone in the liquid or vapor state to obtain valuable and unexpected products by heating said verbanone under conditions to cause substantial isomerization thereof and thereafter recovering the desired compounds or fractions enriched with them by chemical or physical means.

In a more specific aspect of my invention, I can pyrolyze verbanone substantially completely in the vapor phase under certain preferred conditions of temperature and pressure followed by isolation of the compounds and/or fractions enriched with them by distillation.

In that aspect of my invention wherein I pyrolyze verbanone in the vapor phase, I have found that I can effect substantial isomerization of the compound by heating at temperatures of from 350° to 700° C. or higher at ordinary atmospheric pressures. I prefer, however, to effect substantially complete isomerization and/or conversion, and to this end I employ temperatures of from 470° C. or above at atmospheric pressure.

Although I have indicated the use of ordinary atmospheric pressures in the thermal vapor phase isomerization of verbanone, it should be understood that higher or lower pressures can suitably be employed. The time of contact of the verbanone, i.e., the heating time, which is of the order of a few seconds to a few minutes at atmospheric pressure and the temperatures indicated, will accordingly, vary with the use of lower or higher temperatures, e.g., shorter contact times upon the use of higher temperatures, as will be understood by those skilled in the art.

It is convenient also to thermally isomerize verbanone in the liquid phase by heating it in an autoclave at autogenous pressures and at temperatures of 400° C. or higher. Inert gas such as nitrogen may be used to blanket the verbanone, but this is unnecessary.

In order to more fully illustrate the process of my invention and the results thereof, reference is made to the following examples which are given by way of illustration of one specific embodiment of my novel process for the preparation of odor and flavor substances.

EXAMPLE 1

Three samples of verbanone were pyrolyzed under the conditions indicated in Table 1 below by adding the liquid dropwise down the side of a vertical, heated, ¼-inch by 36-inch standard iron pipe. The verbanone added dropwise is vaporized from the side of the pipe and within a few inches of its point of introduction. The pyrolysis temperature was determined from a thermocouple inserted down the center of the pipe.

Table 1

| Sample | Temp. (° C.) | Rate (cc./min.) |
|---|---|---|
| 1 | 410 | 2 to 3 |
| 2 | 470 | 2 to 3 |
| 3 | 530 | 2 to 3 |

Infrared spectra were made of each of the pyrolyzed samples and these indicated the total isomerization as well as the structural features of the products. The sample resulting from treatment at 410° C. was rich in unchanged verbanone, indicating that the time of treatment resulting from this procedure was insufficient at the temperature of 410° C. to cause enough conversion to be economic. The spectrum of the 470° C. pyrolyzed sample indicated some unchanged verbanone as well as new conjugated and non-conjugated carbonyl compounds. Other than an indication of very little, if any, unchanged verbanone, the spectrum of the 530° C. pyrolyzed sample was essentially the same as that of the 470° C. pyrolysate.

EXAMPLE 2

A sample of 407 grams of verbanone was pyrolyzed by the same procedure as described in Example 1. In this case, however, the pyrolysis temperature was maintained at 490° to 510° C. and at an addition rate of from 2 to 3 cc. per minute. An infrared spectrum of the total pyrolysate showed bands of intensities intermediate those of the 470° and 530° C. pyrolysate spectra described in Example 1.

The total pyrolysate was fractionated through an efficient column packed with Pyrex glass helices and nineteen fractions were collected ranging in size from 0.5 to 23.5 grams. Infrared and ultraviolet spectra were made for most of the fractions, and these indicated the number of major compounds as well as their structural features. A combination of this spectral information and chemical data showed the following compounds to be present in the distillate:

Conjugated carbonyl: B.P. 67° to 75° C. at 10 mm., yield 15%. The ultraviolet maximum (in iso-octane) of this carbonyl was at 232 to 233 mμ. The specific absorption coefficient $$(\alpha = E_{1\,cm.}^{g./l.})$$

at this wavelength is greater than 34 for the pure compound.

Non-conjugated ketone: B.P. 77 to 83° C. at 10 mm., yield 21%. This ketone (ca. $n_D^{25}$ 1.4600) had its infrared carbonyl absorption at 5.8μ and therefore indicated that it was a "strained" carbonyl, that is, that the keto group was on a strained ring such as cyclopentane. The compound also contained a methylene ($>C=CH_2$) group as indicated by a broad, intense infrared absorption at 11.2μ which disappeared when fractions in this boiling range were reduced with 60 lbs./sq. in. pressure of hydrogen in the presence of a platinum oxide catalyst.

Conjugated carbonyl: B.P. 86 to 90° C. at 10 mm., yield 15%. This compound (ca. $n_D^{25}$ 1.4720) had its ultraviolet maximum (in iso-octane) at 244 to 245 mμ. The specific absorption coefficient $$(\alpha = E_{1\,cm.}^{g./l.})$$

at this wavelength is greater than 20 for the pure compound. The only characterization determinable from the infrared spectra of the fractions boiling in this range (86 to 90° C.) was that the compound contains no methylene ($>C=CH_2$) group.

Cis-8,9-ortho-menthene-3-one: B.P. 95 to 98° C. at 10 mm.; yield 22%. The infrared spectra of this compound had its major bands at the following wavelengths (μ): 5.85 (broad), 6.08, 6.95 (broad), 7.26, 7.40, 7.55, 7.95, 8.03, 8.22, 8.44, 9.33, 9.66, 10.35, 11.19 (broad), 11.59, 11.95, 12.53 (broad), and 13.38.

The ketone was reduced with 60 lbs./sq. in. hydrogen pressure in the presence of a platinum oxide catalyst to yield cis-o-menthone as shown by comparison of the infrared spectrum of the reduction product with the spectrum of a known sample of cis-o-menthone. The position of the double bond in the compound was established from the fact that the characteristic infrared methylene ($>C=CH_2$) bands at 6.08 and 11.19μ disappeared on reduction.

From the distillation and spectral data it was thus found that the crude pyrolysate had the following approximate composition:

Table 2

| Compound | B.P. at 10 mm., ° C. | Yield, percent |
|---|---|---|
| Conjugated carbonyl | 67–75 | 15 |
| Non-conjugated ketone | 77–83 | 21 |
| Conjugated carbonyl | 86–90 | 15 |
| Cis-8, 9-ortho-menthene-3-one | 95–98 | 22 |
| Non-volatile residue | | 7 |
| Loss [1] | | 20 |
| | | 100 |

[1] Loss due to low boiling fragments.

EXAMPLE 3

Five hundred grams of verbanone was thermally treated by heating it in an autoclave to 400° C. for two hours. The product was removed from the autoclave and fractionated whereby it was shown that the fractions were comparable in composition to those obtained in Example 2 by use of vapor phase pyrolysis.

EXAMPLE 4

Verbanone was pyrolyzed using the equipment described in Example 1 but at a rate of about 5 cc. per minute and at a temperature of about 675° C. The condensed product was fractionated and found to consist of the same pyrolysis products as those described in Example 2.

The pyrolysis of verbanone in accordance with my invention is thus characterized by the following reactions:

Verbanone    Cis-8,9-ortho-menthene-3-one    +other conjugated and non-conjugated carbonyls The fractions and/or compounds identified above were striking in that they all had either a spicy or minty odor. This valuable characteristic of the products renders them useful as odor or flavor imparting compounds, or mixtures as heretofore indicated.

Thus, cis-8,9-ortho-menthene-3-one is a pleasant smelling ketone of high solvent power and can be used as a source of ortho-thymol and ortho-menthone.

Although I have described the characterization and properties of some of the fractions produced by the pyrolysis of verbanone, it should be understood that the preparation of the substantially pure materials is within the scope of my invention since the fractions can obviously be worked up as, for example, by a more efficient distillation column to yield the desired compound.

Other physical or chemical methods of treatment for the isolation of the substantially pure compounds will be apparent to those skilled in the art.

Modifications can also be made in the method of pyrolyzing the verbanone, that is, apparatus, feed rates, variables and the like. Accordingly, it is intended to cover all such departures which fall within the scope of my invention and the appended claims.

Having disclosed my invention, what I claim is:

1. A process for converting verbanone to a mixture comprising cis-8,9-ortho-menthene-3-one which comprises heating said verbanone at temperatures above about 350° C. and thereafter recovering a fraction comprising said cis-8,9-ortho-menthene-3-one.

2. A process according to claim 1 wherein the verbanone is heated in the vapor phase.

3. A process according to claim 1 wherein the verbanone is heated in the liquid phase.

4. A process according to claim 2 wherein the verbanone is heated to a temperature above 470° C.

5. A process for converting verbanone to a series of oxygenated derivatives comprising cis-8,9-ortho-menthene-3-one which comprises heating said verbanone at a temperature in the range of about 350° to 700° C. and thereafter recovering said oxygenated derivatives by fractional distillation.

6. A process according to claim 5 wherein the verbanone is heated at a temperature above 470° C.

References Cited in the file of this patent

Kompa et al.: Ber. Deut. Chem., vol. 70, pp. 788–91 (1937).